United States Patent [19]

Starr

[11] 4,004,901
[45] Jan. 25, 1977

[54] TEMPERING GLASS SHEETS

[75] Inventor: Eugene W. Starr, Allison Park, Pa.

[73] Assignee: PPG Industries, Inc., Pittsburgh, Pa.

[22] Filed: Oct. 28, 1975

[21] Appl. No.: 626,590

[52] U.S. Cl. .................. 65/114; 65/104; 65/348

[51] Int. Cl.² ........................ C03B 27/00

[58] Field of Search ........... 65/104, 114, 115, 348, 65/351

[56] References Cited

UNITED STATES PATENTS 2,093,040 9/1937 Eckert .................. 65/114

3,881,907 5/1975 Starr .................. 65/104 X

*Primary Examiner*—Arthur D. Kellogg
*Attorney, Agent, or Firm*—Dennis G. Millman; Edward I. Mates

[57] ABSTRACT

A multiple stage process for tempering a glass sheet in which a glass sheet, heated to the vicinity of its softening point, is cooled sufficiently rapidly to impart a temper in multiple stages of cooling without marring its softened surfaces to an extent sufficient to impart annoying optical properties.

6 Claims, 4 Drawing Figures

TEMPERING GLASS SHEETS

BACKGROUND OF THE INVENTION

1. Field of the Invention

This invention relates to tempering glass sheets, and particularly to glass sheet tempering involving reducing the consumption of energy during the tempering process. Much energy is required in tempering glass sheets because tempering involves first heating glass to an elevated temperature and then rapidly chilling the heated glass. Any reduction in energy consumption required for glass tempering is very important in these days of energy crisis.

The tempering of a sheet of glass involves the purposeful creation therein of a permanent compressive residual stress in the surface portions of glass sheets by rapidly cooling its surfaces from an elevated temperature, thereby producing a rigid envelope, such that upon subsequent cooling of the glass and hardening its central portion, which tends to contract three-dimensionally during said hardening, produces a substantial compressive stress in the surface portions of the glass sheets. This increases the effective strength of the glass sheet, since glass is relatively strong in compression but weak in tension. A glass sheet so tempered exhibits a high residual compressive stress, so that a relatively high and sudden, sharp, tension-generating stress is required to rupture a sheet of glass of this kind.

Tempered glass sheets having a high residual compressive stress in their surface portions are considerably more resistant to fracture on impact with foreign objects, such as road stones and the like, than similar sheets that are untempered. Furthermore, when tempered glass sheets do break, they form relatively small, relatively smoothly-surfaced particles which are substantially less dangerous than the jagged fragments of untempered glass that result when the latter is fractured.

Those skilled in the art of tempering glass sheets have appreciated that the problems involved in tempering thin glass sheets are more severe than those involved in tempering thicker glass sheets. The tempering process depends upon maintaining a temperature gradient through the thickness of the glass such that the central portion of the glass is above its strain point while the surface portions thereof cool to below the strain point to form a rigid envelope. With relatively thin glass, the time in which this gradient can be accomplished is relatively short, so that with relatively thin glass sheets, it is essential to use a very rapid cooling rate, at least during the initial stages of the cooling necessary to produce a suitable temper. Furthermore, when the cooling is done by applying tempering medium in the form of a gas to the surfaces of the heat-softened glass sheet, the gaseous medium must be supplied to the surfaces of the sheet at a very rapid rate.

Blasts of a gaseous cooling medium imparted against the opposite surfaces of a heat-softened glass sheet to effect the temperature gradient required for tempering during the cooling step are very likely to distort the heat-softened surfaces during the initial cooling of said surfaces. Such distortion spoils the optical properties of a tempered glass sheet. If the cooling medium is applied at a slower rate than that which causes surface distortion, the temperature gradient throughout the glass thickness is liable to be insufficient to provide a temper of sufficient magnitude to insure the production of safety glass.

2. Description of the Prior Art

U.S. Pat. No. 2,093,040 to Eckert relates to a tempering process that may be considered as involving two steps. In the first step, the glass sheet is cooled as quickly as possible by cooling medium to a temperature which lies at or near or somewhat below the annealing temperature of the glass to be hardened, i.e., that temperature at and below which the temporary stresses are mainly developed. After attaining this temperature state, the sheet is further cooled by cooling medium at a slower rate. U.S. Pat. No. 3,223,507 to Thomas discloses a two-step operation in which the temperature of the supporting gas and that of the heat source above the glass is lowered immediately before the glass is exposed to cooling medium in the form of the flow of quenching air that is impinged upon the heated sheet to temper it. The Thomas disclosure concerns a two-step heating operation prior to the cooling step.

U.S. Pat. No. 3,847,580 to Misson discloses a two-step cooling operation during tempering of glass sheets to reduce the frequency of glass breakage by conducting the cooling operation in steps of which the first is the most severe and the others are accordingly less severe but still such as not to permit untempering of the surfaces of the glass.

U.S. Pat. No. 3,881,907 to Starr covers a two-stage cooling operation for tempering in which glass is first cooled by cooling medium in the form of gas previously cooled in a vortex tube during a first stage of cooling at a rate of flow sufficient to at least temporarily harden and increase the resistance of the surface of the glass sheet to deformation followed by a second stage of cooling the glass sheet with additional cooling medium in the form of gas not previously cooled.

U.S. Pat. No. 3,883,339 to Michalik and Neely also discloses a multiple-stage cooling operation as part of a glass tempering process in which a sublimable cooling medium is included in the cooling medium applied during a first stage of cooling followed by cooling with a second, less expensive cooling medium, such as air, during the second stage of cooling.

While some of the aforesaid patents resulted in reducing the consumption of energy required to develop a given temper per unit of glass sheet treated, the present energy crisis makes it important to develop further improvements in the glass tempering process over those represented in the aforesaid patents, particularly those that would involve even more efficient use of energy. Furthermore, the application of cooling medium at a relatively rapid rate in the first stage of a multiple-stage cooling operation, believed to be necessary in the tempering of thin glass sheets, causes surface irregularities which provide optical defects in the finished product.

SUMMARY OF THE INVENTION

According to the present invention, the cooling portion of the tempering of thin glass sheets involves a new sequence of stages. The first stage comprises applying a relatively cool tempering medium at a relatively low pressure against the opposite major surfaces of the heat-softened glass sheets for a limited time sufficient to establish a steep thermal gradient in the glass and to harden the outer surface portions of the glass to improve their resistance to surface distortion. The temperature of the medium is so cool that it compensates for the effect of low pressure on the thermal gradient established in the glass. In the second stage, blasts of tempering medium at ambient temperature conditions are applied at higher pressure to continue to cool the glass and retain a steep thermal gradient through its thickness. The method may include an optional third stage, which comprises applying additional blasts of tempering medium at a relatively moderate pressure. The total power consumption required for the multistage cooling operation is less than is required to temper glass using ambient air at a uniform flow rate per unit of surface area of glass adequate to obtain the desired degree of temper in the glass. Furthermore, the three stage cooling system of the present invention when used with air as the tempering medium and modules of the type depicted in FIGS. 5 and 6 of the aforesaid U.S. Pat. No. 3,881,907 produces less surface damage than prior art systems using the same tempering medium applied through the same type of modules.

More specifically, the present invention represents a further improvement in glass tempering over that disclosed in U.S. Pat. No. 3,881,907 to Eugene W. Starr. The tempering apparatus of this patent supplies tempering medium in the form of air in a first stage of a two stage cooling station through one or more rows of upper and lower modules that receive cold air from cold air supply tubes of vortex tubes which separate pressurized air at ambient temperature conditions into cold and hot air components. The cold air component from the vortex tubes is fed toward the opposite major surfaces of each glass sheet conveyed between opposing sets of modules through which the cold air component is applied to impinge against the opposite surfaces of the glass. In a typical operating example, atmospheric air was supplied to the inlet tubes of the vortex tubes supplying the row of modules facing the upper major surface of the glass sheets at a pressure of 60 pounds per square inch (2 kilograms per square meter) and at a pressure of 20 pounds per square inch (0.7 kilograms per square meter) for the inlet tubes of the vortex tubes supplying the modules applying cold air against the lower surfaces of the glass sheets. Beyond the first stage of cooling air, cold air was provided, air at ambient temperature conditions was applied to an upper plenum at a pressure of 11.5 ounces per square inch (0.04 kilogram per square meter) and to a lower plenum at a pressure of 9 ounces per square inch (0.03 kilogram per square meter). The plenum air was supplied through parallel, slottype nozzles against the upper and lower glass sheet surfaces at ambient temperature.

The early application of air cooled by the vortex tubes improved the compressive stress at the top surface of the glass sheets by about 7 percent and at the bottom surface of the glass sheets by a factor of about 8 percent and also hardened the major surfaces of the glass somewhat more than had been the case when air was supplied at ambient temperature. However, there was still need for the further improvement that the present invention provides, such as making possible the replacement of a 400 horsepower motor with a 150 horsepower motor to run the blower needed for subsequent cooling to insure adequate tempering.

The present invention will be understood more clearly in the light of a description of a preferred embodiment that follows.

BRIEF DESCRIPTION OF THE DRAWINGS

In the drawings that form part of a description of a preferred embodiment of the present invention, where like reference numbers are applied to like structural elements:

FIG. 4 is a fragmentary enlarged sectional view along the lines 4—4 of FIG. 2 showing the arrangement of a double row of staggered modules relative to adjacent conveyor rolls of the illustrative embodiment.

DESCRIPTION OF THE PREFERRED EMBODIMENT

The illustrative embodiment that is presently described relates to glass sheet tempering apparatus incorporating a roller type of conveyor that conveys a series of glass sheets through a hot atmosphere provided by an enclosed furnace where each glass sheet in turn is heated to an elevated temperature sufficient for tempering and then through a cooling station where tempering medium is applied against the opposite surfaces of the moving glass sheets first at a relatively low pressure and a temperature below ambient temperature conditions, then at a relatively high pressure and at a temperature range approximating ambient temperature conditions and, later, at a lower pressure than said relatively high pressure and at a temperature range approximating ambient temperature conditions. However, it is understood that the present invention is capable of being utilized with glass tempering apparatus that utilizes gas support such as disclosed in U.S. Pat. No. 3,223,500 to George W. Misson and U.S. Pat. No. 3,481,724 Eugene W. Starr and George W. Misson.

It is also understood that the present invention is capable of being employed with glass tempering apparatus that uses tongs to suspend glass sheets vertically during the heating and cooling steps involved in glass tempering.

Figure 1:
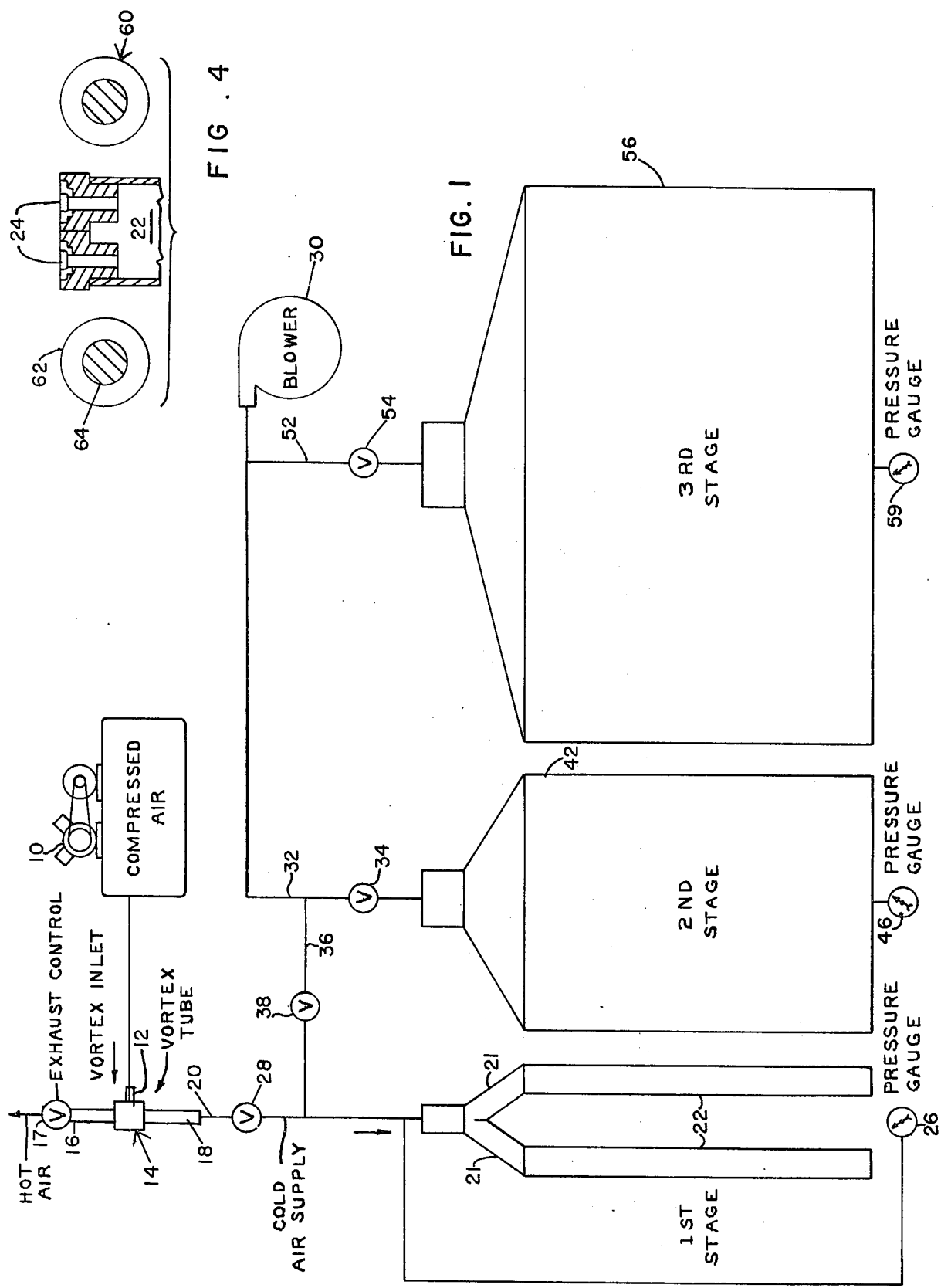
FIG. 1 is a schematic diagram of a supply system for providing air used as a tempering medium at various temperatures and pressures to different stages of a glass sheet tempering apparatus.

The schematic view of FIG. 1 shows a three stage cooling system employed according to the present invention with glass sheets supported for conveyance by any of the methods recited hereinbefore. It is understood, however, that the schematic diagram of FIG. 1 shows the cooling of one major surface of each of a series of glass sheets and that a similar arrangement is provided for cooling the opposite surface of the glass regardless of the plane in which the glass is supported as it is conveyed through the three stages of the cooling station incorporated in the tempering apparatus.

In the first stage of cooling, air is provided under pressure from a compressor 10 through upper and lower vortex inlet tubes 12 (only one of which is shown) to a respective vortex tube 14. The vortex tubes are of the type described and claimed in U.S. Pat. No. 3,173,273 to Fulton, and the details of the structure and operation of the vortex tubes may be obtained from said patent. In order to avoid a needlessly long specification, the details of the vortex tube construction and operation described in said Fulton patent are incorporated in this disclosure by reference.

In the vortex tube, incoming air is separated into a hot air component and a cold air component. The vortex tubes 14 used in the present invention each include a hot air exhaust tube 16 provided with a control valve 17 at its exit end. The hot air may be circulated to wherever needed from tube 16. The cold air component is transmitted through a cold air exhaust tube 18 through a cold air supply conduit 20 into cold air branch conduits 21, each communicating with a module distribution chamber 22 through which air is supplied under pressure into a double row of first stage modules 24 (see FIG. 2). A pressure gauge 26 is provided to determine the pressure in the module distribution chambers 22. The cold air supply conduit 20 is provided with a control valve 28.

In the illustrative embodiment, two double rows of first stage modules 24 extend across the width of the conveyor facing each of the opposite glass sheet surfaces. Each module within the double row of modules communicating with distribution chamber 22 is one inch (2.54 centimeters) wide with a space 1.5 inches (3.81 centimeters) wide to receive a conveyor roll between adjacent double module rows.

The modules in one row of each double row are offset along the length of each row so as to avoid a marked pattern of air flow in the glass sheet surface.

The modules used in all three stages of the cooling station of the tempering apparatus according to the illustrative embodiment are of the type illustrative in FIGS. 5 and 6 of U.S. Pat. No. 3,881,907 to Eugene W. Starr and the details of their construction and operation that are described in said patent are incorporated in the present disclosure by reference.

A blower 30 supplies air under pressure through a second stage supply conduit 32 provided with a control valve 34, as shown schematically in FIG. 1. In addition, a transfer conduit 36 containing a control and shut-off valve 38 communicates between the supply conduit 32 and the cold air supply conduit 20 by tapping the supply conduit 32 between the blower 30 and the second stage control valve 34 and tapping the cold air supply conduit 20 between the control valve 28 and the branch conduits leading to the module distribution chambers 22 to enable an operator to combine air from blower 30 with the cold air component from the vortex tube 14. Supply conduit 32 feeds air under pressure from blower 30 into four branches, each leading into a different one of four second stage modules distribution chambers 42. Each of the chambers 42 communicates with a double row of second stage modules 44 (see FIG. 2) constructed and arranged in a manner similar to the corresponding distribution chambers 22 and modules 24 of the first stage. A pressure gauge 46 is provided to monitor the pressure imparted to the module distribution chambers 42.

The blower 30 also provides air under pressure through a third stage supply conduit 52 provided with a third stage control valve 54 to eight branches, each communicating with a third stage module distribution chamber 56 (see FIG. 2) and thence to third stage modules 58, which are arranged in pairs of offset rows for each third stage distribution chamber 56. This stage has a pressure gauge 59.

Figure 2:
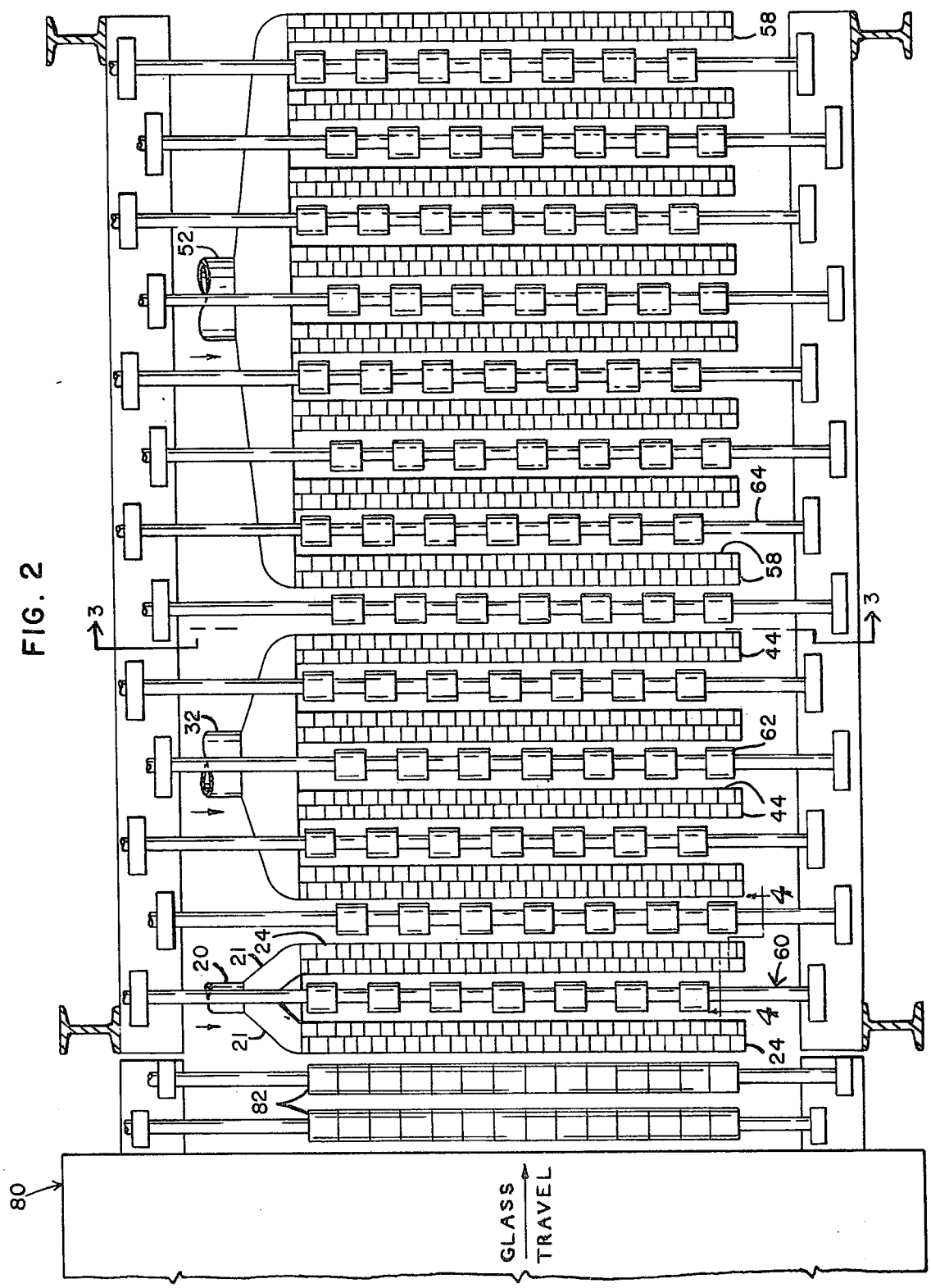
FIG. 2 is a plan view of a lower half of glass sheet tempering apparatus disclosing an arrangement of a conveyor and an air supply system for applying air at various temperatures and pressures to the lower surfaces of a succession of glass sheets at different stages of a glass sheet cooling station of tempering apparatus according to the present invention.

As seen in plan view in FIG. 2, each of the modules 24, 44 and 58 are arranged in pairs of rows with the modules of adjacent rows of a pair of rows staggered with respect to one another. Sufficient space is provided between adjacent pairs of rows of modules to receive conveyor rolls 60 which are of the so-called "doughnut" type provided with spaced "doughnuts" 62 mounted on parallel drive shafts 64 of relatively small diameter. In the illustrative embodiment of the present invention, all the double rows of modules 24, 44 and 58 and their respective distribution chambers 22, 42 and 56 are similar in construction and identically spaced apart from one another.

Figure 3:
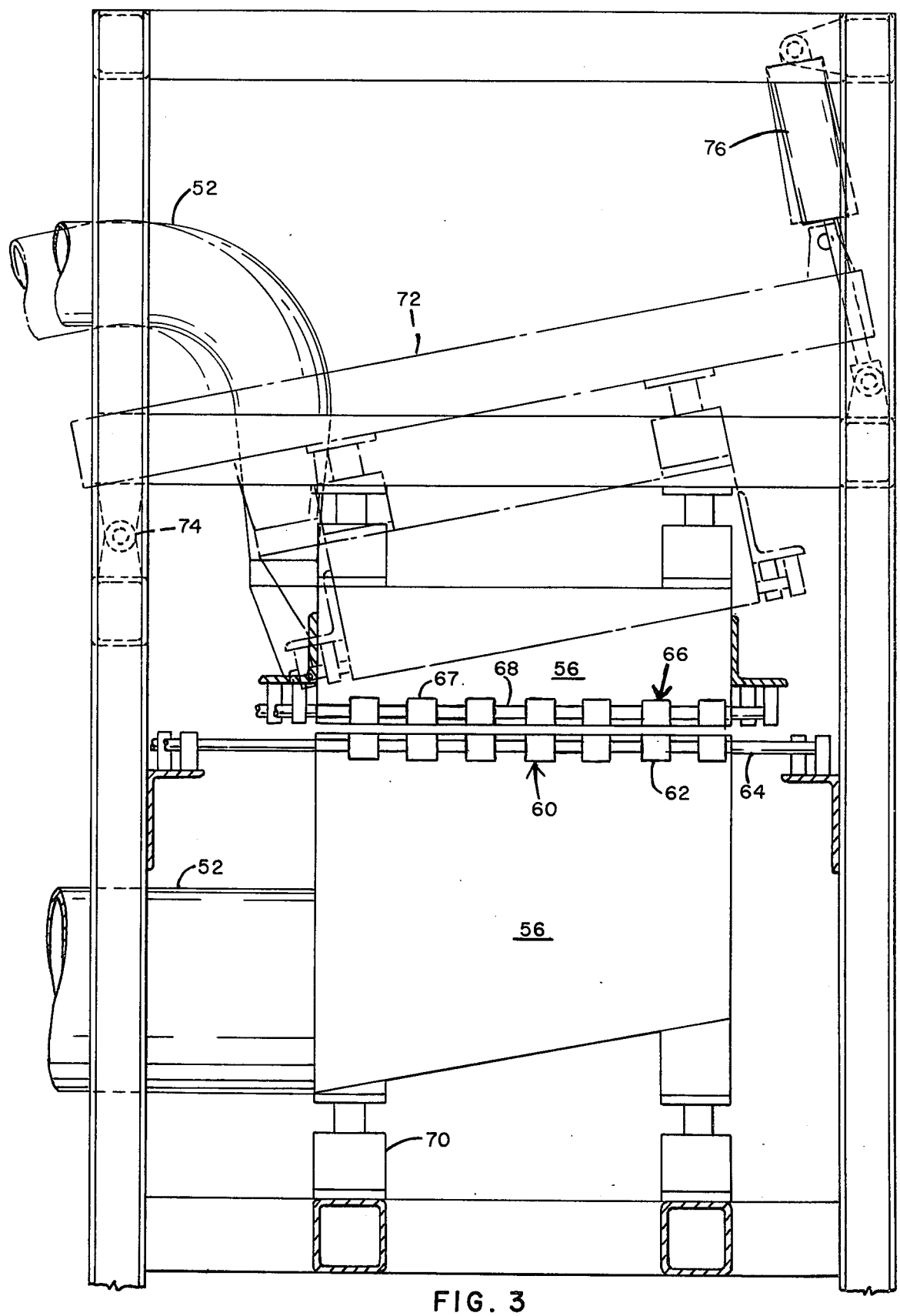
FIG. 3 is a fragmentary sectional view along the lines 3--3 of FIG. 2 showing how means to supply air at various temperatures and pressures to the upper and lower surfaces of moving glass sheets are constructed and arranged relative to one another.

Referring to FIG. 3, the lower modules are supported on a frame-like lower module support structure 70 and the upper modules and module distribution chambers are supported on a frame-like upper module support structure 72. The upper support structure 72 is pivotally supported with respect to the lower support structure 70 about pivot means 74. A piston and clevis arrangement 76 controls pivotal movement of the upper support structure 70 relative to the lower support structure 72 between a "down" position in which the modules supported by the upper and lower support structures provide surfaces parallel to and spaced from one another to an "up" position in which the outer surfaces of the upper modules are pivoted away from the outer surfaces of the lower modules to facilitate entry of personnel into the equipment whenever access is needed for inspection, repair or maintenance.

FIG. 3 also shows a series of hold-down rolls 66, similar construction to the conveyor rolls 60, having axially spaced doughnuts 67 mounted on parallel shafts 68. In their "down" position, the doughnuts are located so that the lowest portions of their circumferences lie in a common tangential plane parallel to and spaced from a common tangential plane formed at the upper ends of the doughnuts 62 of the conveyor rolls 60, a distance slightly more than the glass sheet thickness. The spaces between adjacent rolls 60 and 66 and between adjacent double rows of modules 24, 44 and 58 and their associated distribution chambers 22, 42 and 56 provide sufficient room for air to escape after impinging against the opposite major surfaces of the glass sheets to cool the latter.

As seen in the plan view of FIG. 2, the three stages cooling apparatus of the present invention is located beyond a furnace 80, and a cylindrically-shaped roll 82, similar to those provided throughout the length of the furnace 80, is provided between the furnace exit and the first double row of first stage modules 24 to propel the leading sheet of a series of glass sheets from the furnace to the first stage of the cooling station. The conveyor speed is adjusted so that each glass sheet in the series reaches the first stage of the cooling station at a temperature sufficient for tempering and is cooled at the first stage sufficiently rapidly to induce a temperature gradient through the glass thickness with sufficient surface cooling to harden the surface and provide sufficient compression stress to reduce the incidence of glass breakage during tempering.

Various experiments were performed on a regular production line to compare various combinations of pressure and temperature at the three stages of the cooling station of the tempering apparatus with standard operation conditions for the tempering apparatus. All of the tests enumerated herein were performed on glass sheets having nominal thickness of ⅛ inch (3.2 millimeters) and a module-to-module spacing from top to bottom modules through the glass thickness of 0.27 to 0.23 inches (6.86 to 5.84 millimeters), which was constant throughout the tests.

An instrument known as a Differential Surface Refractometer described in ISA Transactions, Volume 4, No. 4, October 1965, was used to measure surface compression stress in the test samples. Also, the degree of temperature was evaluated by weighing the largest crack-free particle of each tempered article and the total weight of the ten largest particles after the article was pierced with a punch about ½ inch (1.27 centimeters) from an edge midway of its largest edge and comparing these values with standard values acceptable to PPG Industries, Inc. of 4.25 grams as the maximum permissible weight for the largest crack-free glass particle, regardless of thickness of the tempered glass sheet. The standard values acceptable to PPG are much more rigid than those established by American National Standards Institute, Inc., performance specifications for safety glazing material used in buildings Z97.1–1972, using an impacting leather punching bag filled with number 7 ½ chilled lead shot. According to this test, when disintegration occurs, the ten largest crack-free particles obtained 3 minutes after the impact test are weighted and their total weight in grams must not exceed 412 times the thickness in inches of the sheet tested. For glass sheets having a nominal thickness of ⅛ inch (approximately 3.2 millimeters), this value is 51.5 grams or less for glass passing the temper test.

In order to perform the experiments reported in the tables of results that follow, provision was made to optionally connect air from the plant blower tha normally supplies atmospheric air at ambient conditions under pressure directly to the glass sheet surfaces to the inlet tubes of vortex tubes so as to make it possible to apply either the cold component of air cooled by the vortex tube or air supplied at ambient temperaure directly from the blower at various controlled pressure conditions, or a blend of air at ambient conditions with air cooled using the vortex. This arrangement made is possible to obtain meaningful data with or without the vortex operating while maintaining operating furnace conditions and throughput of commercially acceptable tempered glass.

In typical operations where the vortex tube lowered the temperature of the air supplied to the first stage to 30°–65° F (17°–36° C) below ambient air conditions, module air flow rates of 3 to 4 standard cubic feet per minute (approximately 1400 to 1900 cubic centimeters per second) produced an acceptable level of temper in glass sheets having a nominal thickness of ⅛ inch (approximately 3 millimeters). By comparison, with the vortex not operating, and air supplied at ambient conditions, flow rates in the range of 5.5 to 7 standard cubic feet per minute (approximately 2600 to 3300 cubic centimeters per second) are required for acceptable tempering.

During the tests reported, flow measurements were taken at the different stages of a cooling station of a production line for tempering glass sheets using a model 4100 Thermosystems air flow meter system with a 10 module adapter.

A first series of tests was made in the production of pattern CPI-57-015 to compare two three-stage operations, one (the control operation) using ambient air in all three stages and the other (the test operation) using the cold air components of air cooled by vortex tubes in the first stage at a lower pressure than that at which air at ambient temperature conditions was applied in the first stage. Identical pressures of ambient temperature air were applied in the second stage of the control operation and the test operation. In the third stage, the pressure of ambient temperature air applied in the control operation was equal to that applied in the test operation. A comparison of the results in Table I that follows shows that relatively cold air applied in the first stage of the test operation at a temperature about 35° F. (19.4° C.) cooler and at less than half the pressure of the first stage of the control operation improved the temper (as determined by average surface compression stress and average edge compression stress) by 16 percent. Also, the resulting particle size as determined by the average total weight of the ten largest particles in each sample was reduced by 34 percent, indicating improved temper.

Various values for the Tables that follow were measured in English units. The following conversion factors are given for conversion to the metric system:

1. Degrees Fahrenheit (F) is convertible into Centigrade (C) by the formula    C = five nineths (F-32)
2. Pressure in Ounces per Square Inch (O.S.I.) is convertible into kilograms per square meter by multiplying by 0.002119.
3. Pressure in Pounds per Square Inch (P.S.I.) is convertible into Kilograms per square meter by multiplying by 0.033906.
4. Horsepower units are convertible into kilowatts by multiplying by 0.746.

TABLE I

COMPARISON OF GLASS TEMPER RESULTING FROM USING AMBIENT AIR COOLING (CONTROL) AND VORTEX AIR COOLING (TEST) IN FIRST STAGE OF THREE STAGE COOLING OPERATIONS

| Pattern | CPI-57-015 | |
|---|---|---|
| Method of Tempering | Control | Test |
| Glass Thickness | ⅛ inch (3.2 millimeters) | |
| Air Temperature (° F) (Top/Bottom) | | |
|   1st Stage | 134/136 | 106/94 |
|   2nd Stage | 134/136 | 134/136 |
|   3rd Stage | 134/136 | 134/136 |
| Plenum Pressure (O.S.I.) (Top/Bottom) | | |
|   1st Stage | 62/70 | 30/30 |
|   2nd Stage | 72/78 | 72/78 |
|   3rd Stage | 53/31 | 53/31 |
| Average Surface Compression (PSI) | 17,618 | 20,880 (+16%) |
| Average Edge Compression (PSI) | 13,638 | 16,186 (+16%) |
| Particle Weight (Grams) | | |
| Average Weight of Largest Particle | 1.16 | 0.74 (−34%) |
| Average Total Weight of Ten Largest | | |

TABLE I-continued

COMPARISON OF GLASS TEMPER RESULTING FROM USING AMBIENT AIR COOLING (CONTROL) AND VORTEX AIR COOLING (TEST) IN FIRST STAGE OF THREE STAGE COOLING OPERATIONS

| Particles | 8.3 | 5.3 (−34%) |
|---|---|---|
| 1st Stage Air Source | 400 HP Blower | Vortex |
| 2nd Stage Air Source | 400 HP Blower | 400 HP Blower |
| 3rd Stage Air Source | 400 HP Blower | 400 HP Blower |

In the second set of tests performed on production pattern GE-57-0138, a control operation in which air at approximately ambient temperature was applied in the first cooling stage at less pressure than that in the second stage was compared to a three-stage test operation in which the air for the first stage was a blend of the cold air component cooled by the vortex tube and air at ambient temperature provided by the blower supplying air for the second stage at ambient temperature conditions. Table II shows that even though the test operation provided blended air at a lower pressure in the first stage than that at which the air was provided in the control operation, the temper was improved in the test operation as evidenced by a 10 percent increase in average surface compression, a 15 percent increase in average edge compression and a 43 percent reduction in the average of the total weight of the largest ten particles in each sample fragmented by a punch.

A further test was performed in the production of pattern WHI-157-0003 comparing a control three-stage cooling operation in which a blower supplied ambient temperature air for the first stage of cooling with a test operation in which a blend of ambient temperature air and air cooled with a vortex tube was used in the first stage under the conditions recited in Table III. In this test, both the pressure and temperature in the first stage was less for the test operation than the corresponding first stage pressure and temperature in the control operation, while in the second stage, ambient temperature air was supplied at a lower pressure in the second stage of the test operation than in the second stage of the control operation. Despite the reduced pressure in both the first and second stages, Table III shows an improved average temper of the test operation over the control operation.

TABLE II

COMPARISON OF GLASS TEMPER RESULTING FROM USING AMBIENT AIR COOLING (CONTROL) AND COOLING BY BLEND OF AMBIENT AIR AND VORTEX COOLED AIR (TEST) IN FIRST STAGE OF THREE STAGE COOLING OPERATION

| Pattern | GE-57-0138 | |
|---|---|---|
| Method of Tempering | Control | Test |
| Glass Thickness | ⅛ inch (3.2 millimeters) | |
| Air Temperature (° F) (Top/Bottom) | | |
| 1st Stage 133/130 | 105/96 | |
| 2nd Stage | 133/130 | 133/130 |
| 3rd Stage | 133/130 | 133/130 |
| Plenum Pressure (O.S.I.)(Top/Bottom) | | |
| 1st Stage | 41/48 | 33/26 |
| 2nd Stage | 68/66 | 65/70 |
| 3rd Stage | 48/32 | 50/33 |
| Average Surface Compression (PSI) | 16,093 | 17,750 (+10%) |
| Average Edge Compression (PSI) | 15,890 | 18,155 (+15%) |
| Particle Weight (Grams) | | |
| Average Weight of Largest Particle | 2.25 | 1.12 (−50%) |
| Average Total Weight of Ten Largest Particles | 17.1 | 9.82 (−43%) |
| 1st Stage Air Source | 400 HP Blower | Blend |
| 2nd Stage Air Source | 400 HP Blower | 400 HP Blower |
| 3rd Stage Air Source | 400 HP Blower | 400 HP Blower |

TABLE III

COMPARISON OF GLASS TEMPER RESULTING FROM COMPARISON OF CONTROL THREE STAGE COOLING WITH TEST THREE STAGE COOLING AT LOWER PRESSURE IN FIRST TWO STAGES

| Pattern | WHI-157-0003 | |
|---|---|---|
| Method of Tempering | Control | Test |
| Glass Thickness | ⅛ inch (3.2 millimeters) | |
| Air Temperature (° F) (Top/Bottom) | | |
| 1st Stage | 118/112 | 88/76 |
| 2nd Stage | 118/112 | 118/112 |
| 3rd Stage | 118/112 | 118/112 |
| Plenum Pressure (O.S.I.) (Top/Bottom) | | |
| 1st Stage | 36/45 | 33/30 |
| 2nd Stage | 86/70 | 80/70 |
| 3rd Stage | 65/49 | 69/52 |
| Average Surface Compression (PSI) | 18,010 | 20,100 (+10%) |
| Average Edge Compression (PSI) | 19,415 | 20,053 (+3%) |
| Particle Size | | |
| Average Weight of Largest Particle | .84 | .70 (−17%) |
| Average Total Weight of Ten Largest Particles | 6.28 | 4.7 (−24%) |
| 1st Stage Air Source | 400 HP Blower | Blend |
| 2nd Stage Air Source | 400 HP Blower | 400 HP Blower |

TABLE III-continued
COMPARISON OF GLASS TEMPER RESULTING FROM COMPARISON OF CONTROL THREE STAGE COOLING WITH TEST THREE STAGE COOLING AT LOWER PRESSURE IN FIRST TWO STAGES

| | | |
|---|---|---|
| 3rd Stage Air Source | 400 HP Blower | 400 HP Blower |

The test results of Table III indicated that ambient air for the second and third stages could be supplied by a smaller blower than a 400 HP blower. For the tests reported in Table IV, a 150 HP blower was used to supply air for the second and third stages for the test operation with the cold air component from the vortex tubes supplying air for the first stage. No exact comparisons are available with the same pattern using a control operation because, by the time these last tests were performed, the feasibility of using lower pressure-lower temperature air in the first stage of a multi-stage operation had been established. However, the patterns compared have the same thickness and differ in dimensions by a small factor believed to be inconsequential in causing a significant difference in stress pattern. A surprising discovery from the use of a 150 HP blower instead of a 400 HP blower in the second and third stages of a three-stage cooling operation was that the 150 HP blower delivered ambient air at a lower temperature than the temperature of ambient air provided by the 400 HP blower previously used. Table IV shows the results obtained with glass having the same thickness as the control samples of Table I.

bounce against the conveyor rolls and/or the hold-down rolls as the glass sheets pass through the first stage of the cooling station where the glass surface temperature is being cooled to a temperature range below its strain point. In this temperature range, the glass sheets are most likely to develop vents along the surfaces and edges that make the glass susceptible to fracture on further cooling. In a production furnace where 93 percent is the average yield obtained for tempering glass sheets ⅛ inch thick (nominally 3 millimeters), over 42,000 tempered glass sheets were produced using the three-stage test cooling operation of Table IV comprising the cold air component of air passed through vortex tubes in the first stage at a relatively low pressure and air at ambient temperature conditions supplied by a 150 HP blower in the second and third stages at a yield of 94.0 percent.

The rate of production was such that each glass sheet in turn passed through the first stage where its surfaces were cooled from about 1220° F (660° C) to less than 900° F (482° C) in approximately one second. In the second stage, which the glass sheets traversed in approximately two seconds, the glass surfaces cooled to

TABLE IV
COMPARISON OF TABLE I CONTROL THREE STAGE COOLING WITH THREE STAGE COOLING USING VORTEX COOLER FOR FIRST STAGE AIR AND SMALLER BLOWER TO SUPPLY AIR FOR SECOND AND THIRD STAGES

| | Control | Test |
|---|---|---|
| Glass Thickness | 1/8 inch (3.2 millimeters) | |
| Air Temperature (° F) (Top/Bottom) | | |
| 1st Stage | 134/136 | 69/63 |
| 2nd Stage | 134/136 | 100/93 |
| 3rd Stage | 134/136 | 100/93 |
| Plenum Pressure (O.S.I.) (Top/Bottom) | | |
| 1st Stage | 62/70 | 31/30 |
| 2nd Stage | 72/78 | 43/33 |
| 3rd Stage | 53/31 | 31/30 |
| Average Surface Compression (PSI) | 17,618 | 16,703 |
| Average Edge Compression (PSI) | 13,638 | 15,473 |
| Average Weight of Largest Particle (grams) | 1.16 | 1.2 |
| Average Total Weight of Ten Largest Particles | 8.3 | 8.7 |
| Air Sources | | |
| 1st Stage | 400 HP Motor | Vortex |
| 2nd Stage | 400 HP Motor | 150 HP Motor |
| 3rd Stage | 400 HP Motor | 150 HP Motor |
| TOTAL POWER USED (Kilowatts) | 382 | 205 |

A comparison of the three-stage test operation of Table IV using vortex tubes to supply cold air at low pressure to the first stage and a relatively small blower (150 HP) to supply air to the second and third stages of a three-stage control operation of Table I where a relatively large blower (400 HP) supplied air to all three stages indicates that the total power consumed by the test operation according to the present operation to produce an acceptable temper is slightly more than half the total power required using the older system involving the larger blower.

Another feature of the present invention is that the lower pressure at which the cold air component is supplied at the first stage reduced the tendency of the air impinging on the glass to cause the glass sheets to about 700° F (371° C), and the lowest temperature in the glass was near its strain point (950° F/510° C). In the third stage, which the glass sheets traversed in about four seconds, the glass surfaces cooled to below 500° F (260° C). (It is understood that these times are suitable for glass sheets having nominal thickness of ⅛ inch (approximately 3 millimeters) and that other parameters are probably more suitable for different glass sheet thicknesses.)

The combination of pressure of air application and temperature of air application was such that the heat transfer rate was greatest in the first stage, intermediate in the second stage and lowest in the third stage.

Estimated values for the heat exchange rates obtained in the test operation of Table IV are:

|  | British Thermal Units Per Hour Per Square Foot Per Degree Fahrenheit | Gram Calories Per Hour Per Square Centimeter Per Degree Centigrade |
|---|---|---|
| 1st Stage | 100 | (approximately 124) |
| 2nd Stage | 88 | (approximately 109) |
| 3rd Stage | 73 | (approximately 90-91) |

Replacing the 400 HP blowers with 150 HP blowers also reduced the noise pollution in the plant. Operators on the line are more comfortable during their working hours than they were previously when they were exposed to greater noise levels.

It is understood that the heat transfer rate can be increased by reducing the space between the upper and lower modules without changing any of the other parameters. An increase in heat transfer rate results in a higher temper level. All the tests reported in the Tables were performed with the same arrangement of module spacing between the upper and lower modules throughout the three stages of the production tempering apparatus on which the tests reported were performed.

The form of the invention shown and described in this disclosure represents an illustrative preferred embodiment thereof. It is understood that various changes may be made without departing from the gist of the invention as defined in the claimed subject matter which follows.

What is claimed is:

1. A method of tempering a glass sheet comprising the steps of:
   a. heating the glass sheet to an elevated temperature sufficient for tempering;
   b. cooling the surfaces of the glass sheet by impinging chilled tempering medium having a first temperature upon the glass at a first pressure so as to establish a thermal gradient through the glass thickness and harden the surfaces of the sheet;
   c. further cooling the surfaces of the glass sheet by impinging tempering medium having a second temperature higher than said first temperature upon the glass at a second pressure higher than said first pressure so as to continue maintenance of a thermal gradient through the glass thickness and impart a tempered condition thereto; and
   d. cooling the glass sheet through its thickness to ambient temperature.

2. The method of claim 1 further including a third step of impinging tempering medium at the surface of the glass at a temperature essentially the same as said second temperature and at a pressure lower than said second pressure.

3. The method of claim 1 wherein the tempering medium is air and is chilled to said first temperature by use of a vortex tube.

4. The method of claim 3 wherein said second temperature is about 30° F. higher than said first temperature.

5. The method of claim 1 wherein the application of tempering medium at said first temperature and said first pressure is continued for a sufficient period of time to reduce the temperature of the surface of the glass to below the strain point of the glass, and the application of tempering medium at said second temperature and said second pressure is continued until the maximum temperature within the glass approximates the strain point of the glass.

6. The method of claim 5 wherein the glass sheet has a nominal thickness of ⅛ inch, said tempering medium is air, the air being impinged upon the glass at said first temperature and said first pressure for approximately one second and at said second temperature and said second pressure for approximately two seconds.

* * * * *

UNITED STATES PATENT AND TRADEMARK OFFICE
CERTIFICATE OF CORRECTION

PATENT NO. : 4,004,901
DATED : January 25, 1977
INVENTOR(S) : Eugene W. Starr

It is certified that error appears in the above-identified patent and that said Letters Patent are hereby corrected as shown below:

Column 3, line 41, "0.7kilograms" should be --0.7 kilograms--.

Column 3, line 50, "slottype" should be --slot-type--.

Column 7, line 29, "weighted" should be --weighed--.

Column 7, line 37, "tha" should be --that--.

Column 7, line 42, "temperaure" should be --temperature--.

Column 7, line 45, "is" should be --it--.

Column 8, line 43, "five nineths" should be --5/9--.

Column 9, line 38, Table II, after "1st Stage", "133/130" should be placed under the column headed "Control" and "105/96" should be placed under the column headed "Test".

Column 10, line 39, Table III, after "Plenum Pressure (O.S.I.)", "(Iop/Bottom)" should be --(Top/Bottom)--.

Signed and Sealed this

Twenty-sixth Day of April 1977

[SEAL]

Attest:

RUTH C. MASON
*Attesting Officer*

C. MARSHALL DANN
*Commissioner of Patents and Trademarks*